United States Patent [19]

Munsey

[11] Patent Number: 5,429,305

[45] Date of Patent: Jul. 4, 1995

[54] PLANT FERTILIZER AND PESTICIDE SPRAYER APPARATUS

[76] Inventor: Ross N. Munsey, R.R.1, C33, Salmon River Road, Falkland, British Columbia V0E 1W0, Canada

[21] Appl. No.: 246,778

[22] Filed: May 20, 1994

[30] Foreign Application Priority Data

Jul. 16, 1993 [CA] Canada .................. 2100731

[51] Int. Cl.⁶ ............................................. B05B 1/28
[52] U.S. Cl. ........................... 239/152; 239/288; 239/653; 239/662
[58] Field of Search ............ 239/662, 152, 288–288.5, 239/104, 153, 154, 653, 650

[56] References Cited

U.S. PATENT DOCUMENTS

| | | | |
|---|---|---|---|
| 1,382,817 | 1/1921 | Salander | 239/104 |
| 2,548,196 | 4/1951 | Clark | 239/288.5 X |
| 3,464,629 | 9/1969 | Peters | 239/104 |
| 3,945,571 | 3/1976 | Rash | 239/152 |
| 4,658,778 | 4/1987 | Gomotz et al. | 239/152 X |
| 5,150,837 | 9/1992 | Ferrari | 239/152 X |

FOREIGN PATENT DOCUMENTS

204222 3/1965 Sweden ................ 239/288.5

*Primary Examiner*—Andres Kashnikow
*Assistant Examiner*—Kevin P. Weldon
*Attorney, Agent, or Firm*—George A. Seaby

[57] ABSTRACT

In an effort to give a conifer seedling a chance to grow, it is common practice to apply fertilizer to the seedling itself while spraying a herbicide onto the area around the seedling. Both of these tasks can be arduous and time consuming especially in view of the nature of the terrain where seedlings are planted. Uncontrolled herbicide application can harm the seedling as much as the weeds. The present invention provides a device, which is easy to manipulate manually, and which enables the user to apply fertilizer to the seedling while simultaneously applying herbicide to the area around the seedling. The invention also provides a shroud for protecting the seedling while herbicide is being sprayed therearound.

15 Claims, 10 Drawing Sheets

PLANT FERTILIZER AND PESTICIDE SPRAYER APPARATUS

BACKGROUND OF THE INVENTION

FIELD OF THE INVENTION

This invention relates to a plant fertilizer and pesticide sprayer apparatus.

More specifically, the invention relates to an apparatus which protects the seedling while applying fertilizer thereto and spraying the area around the seedling with a herbicide. While specifically designed for spraying herbicide, it will be appreciated that the apparatus described herein also be used to spray other pesticides such as insecticides.

DISCUSSION OF THE PRIOR ART

In the past, attempts have been made to protect conifer and other seedlings during the application of herbicide to the area around the seedlings. Examples of apparatuses for protecting young plants are found in Canadian Patent No. 584,896, issued to William Dickison on Oct. 13, 1959 and Canadian patent No. 763,664, issued to Michael R. Hills on Jul. 25, 1967. The inventions described in these patents provide adequate protection for the seedling. However, the patented apparatuses do not provide for simultaneous application of fertilizer to the seedling, and therefore do not obviate the need for two separate, time consuming operations.

GENERAL DESCRIPTION OF THE INVENTION

The object of the present invention is to enable a worker to fertilize a seedling while simultaneously applying herbicide to the area around the seedling.

Another object of the invention is to protect a seedling from herbicide while the latter is being applied to the area around the seedling.

The above objects are met by a plant fertilizer and pesticide sprayer apparatus comprising manually manipulable frame means; shroud means on one end of said frame means for covering a plant during pesticide application; pump means carried by said frame means for dispensing pesticide from a source thereof to an area around said shroud means; fertilizer dispensing means carried by said frame means for applying fertilizer from a source thereof to the area inside said shroud means; and trigger means for simultaneously operating said pump means and said fertilizer dispensing means.

BRIEF DESCRIPTION OF THE DRAWINGS

The invention will be described hereinafter in greater detail with reference to the accompanying drawings which illustrate preferred embodiments of the invention, and wherein.

DESCRIPTION OF PREFERRED EMBODIMENT

While (as mentioned above) the invention can be used to spray any pesticide, the following description of preferred embodiments is limited to a herbicide sprayer and fertilizer.

Figure 1:
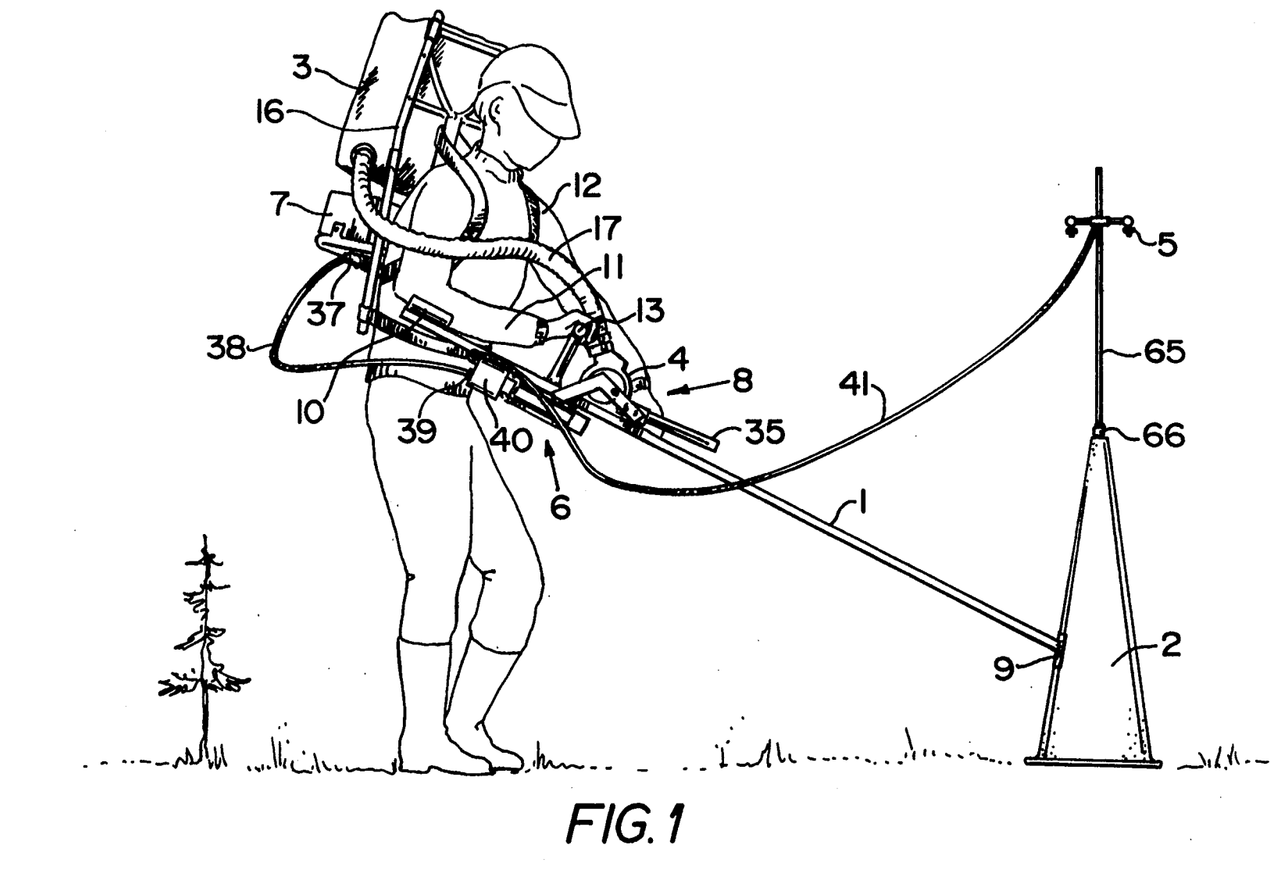
FIG. 1 is a schematic perspective view of a plant fertilizer and pesticide sprayer apparatus in accordance with the invention.

With reference to FIG. 1, the basic elements of one embodiment of the apparatus of the present invention include a frame defined by an elongated square cross section tube 1, a conical shroud 2 for receiving fertilizer flowing from a bag 3 through a metered dispenser 4 and the tube 1, and for protecting a plant, a spray head 5 for spraying herbicide around the shroud 2, a pump generally indicated at 6 for receiving liquid herbicide from a plastic container 7 and for feeding the herbicide to the spray head 5, and a trigger mechanism generally indicated at 8 for causing fertilizer to enter the tube 1 and herbicide to pass through the combination pump 6.

The fertilizer tube 1 is merely a square cross section tube formed of aluminum or another lightweight material. The tube 1 is attached to the shroud 2 by a rectangular flange 9 at the bottom, discharge end of the tube. An arcuate plate 10 is attached to the upper end of the tube 1 for receiving the forearm 11 of a person 12 using the apparatus. A T-shaped handle 13 extends upwardly from the tube 1 near the upper end thereof for gripping by one hand of the user. A second, generally C-shaped, inclined handle 14 (FIGS. 2 to 4) is provided on the tube 1 at a location lower than the handle 13 for gripping by the other hand of the user. With this arrangement of the plate 10 and the handles 13 and 14, the apparatus can easily be manipulated cantilever-style by the user.

Granular fertilizer is stored by the waterproof bag 3, which is carried by a backpack frame 16. The bag 3 is mounted on the frame 16 above the container 7.

Figure 2:
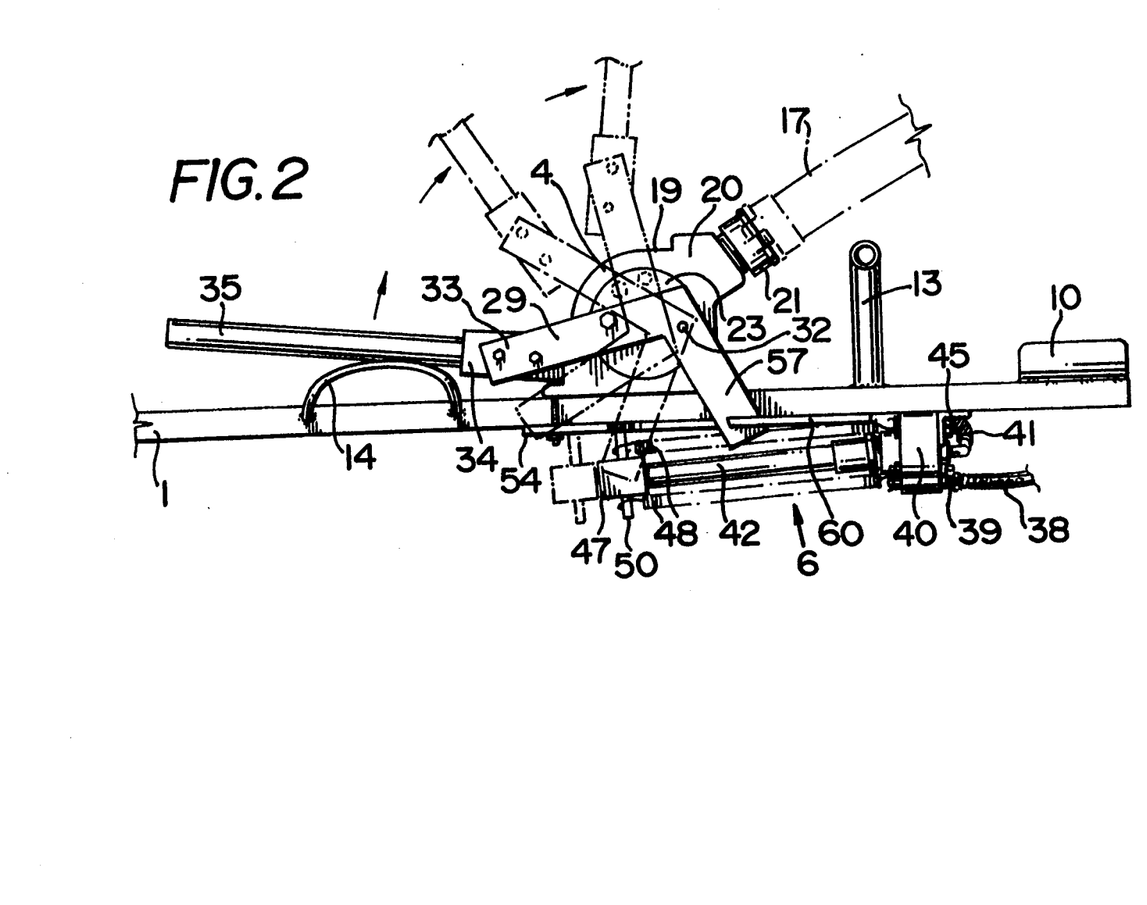
FIG. 2 is a side elevational view of one end of the apparatus of FIG. 1.
Figure 5:
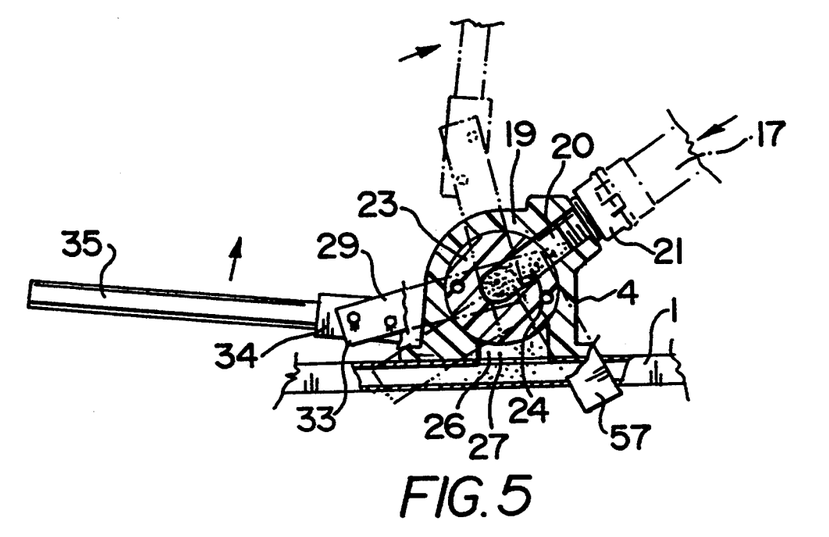
FIG. 5 is a cross-sectional view of a fertilizer dispenser used in the apparatus of FIGS. 1 to 4.

The fertilizer flows from the bag 3 through a flexible tube 17 to the metered dispenser 4 which is connected to the trigger mechanism 8. The dispenser is defined by a generally annular casing 19 mounted on the tube 1. The casing 19 includes an internally threaded inlet opening 20 (FIGS. 2, 3 and 5) for receiving an externally threaded coupler 21 on one end of the tube 17. A disc-shaped body 23 is rotatably mounted in the casing 19. A well 24 is provided in the body 23 for receiving a predetermined quantity of fertilizer from the bag 3. In the rest position of the apparatus, the well 24 is aligned with the inlet opening 20. The body 23 can be rotated to align the well 24 with aligned openings 26 and 27 in the bottom of the casing 19 and in the tube 1, respectively, whereby fertilizer is discharged into the tube. The body 23 is rotated by a pair of generally L-shaped levers 29 which are mounted on the body by means of a bolt 30 and a nut 31, and a plastic pin 32 (FIG. 2). The upper ends 33 of the levers 29 are interconnected by a block 34 on the bottom end of a handle 35.

Liquid herbicide passes from the container 7 through a filter 37, a tube 38, a one-way valve 39 and a manifold 40 into the pump 6. Liquid flows from the pump 6 through a tube 41 to the spray head 5.

Figure 3:
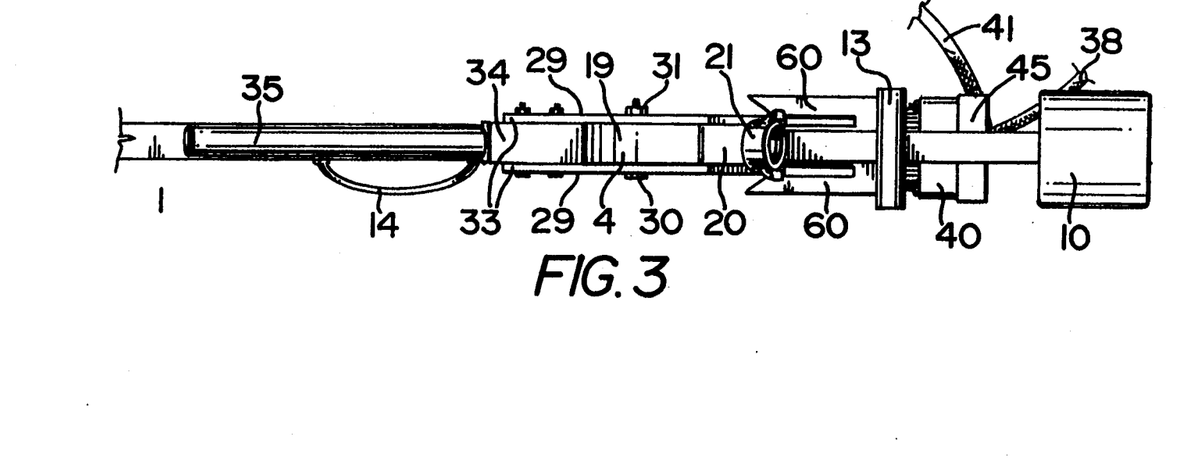
FIG. 3 is a top elevational view of one end of the apparatus of FIG. 1.
Figure 4:
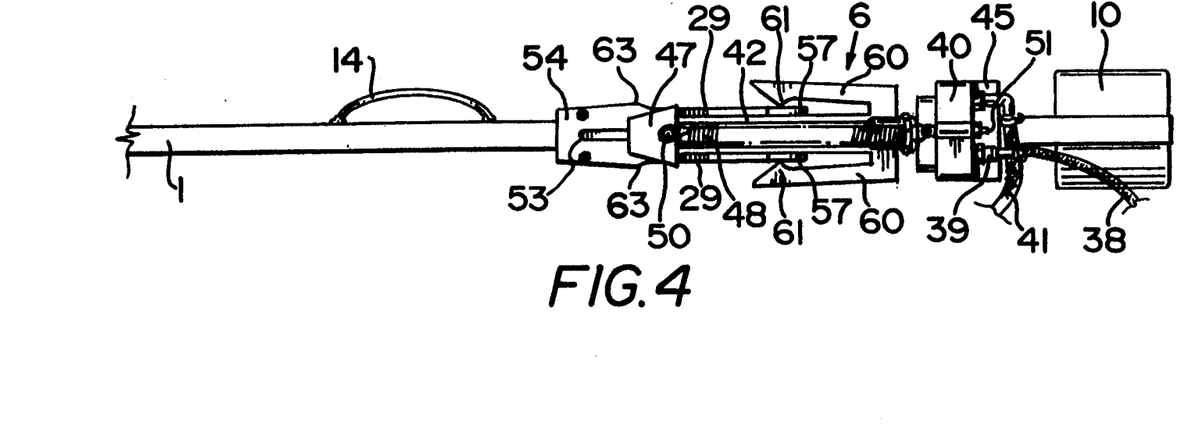
FIG. 4 is a bottom elevational view of one end of the apparatus of FIG. 1.

As best shown in FIGS. 2 to 4, the pump 6 includes a tubular cylinder 42 containing a slidable piston (not shown). In FIG. 2, the cylinder 42 is shown to be inclined. In fact, the angle of inclination of the cylinder 42 is very small, and could be reduced to zero by mounting the cylinder parallel to the tube 1. One end of the cylinder 42 extends into the plastic manifold 40, through which herbicide is introduced into and discharged from the cylinder 6. The manifold 40 is mounted on the tube 1 by means of an L-shaped bracket 45. A block 47 is provided on the other end of the cylinder 42. Actually, the block 47 is connected to the piston rod (not shown) in the cylinder 42 for movement therewith. The piston rod is biased to the closed or rest position by a pair of helical springs 48 extending between the manifold 40 and a rod 50 extending through the block 47. One end of each spring 48 is connected to an eyebolt 51 extending through the manifold 43, and the other end of each spring looped around the rod 50. The rod 50 extends into an elongated, longitudinally extending slot 53 in a plate 54. The plate 54 includes holes 55 for mounting the plate on the bottom of the tube 1.

Figure 6:
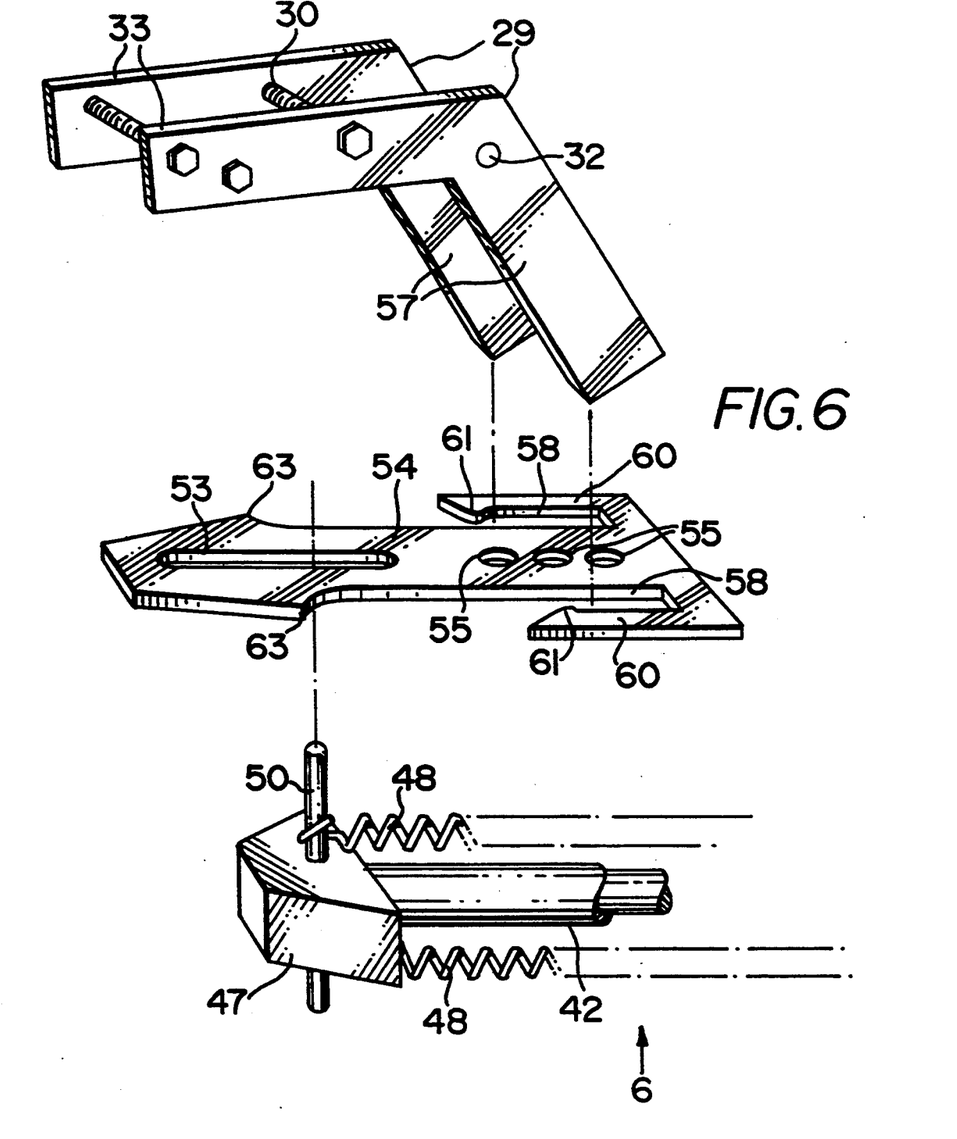
FIG. 6 is an exploded, perspective view of a trigger mechanism used in the apparatus of FIGS. 1 to 4.

The block 47 is caused to move forwardly to draw the piston to the extended position by the L-shaped levers 29 (FIGS. 2 to 4 and 6) mounted on the body 23 for rotation therewith. The bottom arms 57 of the levers 29 normally extend downwardly through slots 58 (FIG. 6) in the plate 54. The slots 58 have open front ends, and are defined by arms 60 on the plate 54. A generally V-shaped projection 61 extends inwardly from the free, leading end of each arm 60 into the path of travel of one arm 57 of the lever 29 releasably retaining the lever 29 in the rest position (solid lines in FIG. 2). Larger projections 63 are provided on the sides of the plate 54 near the front end thereof for deflecting the arms 57 of the levers 29 outwardly, whereby the block 47 is released. Once the block 47 is released by the levers 29, the springs 48 move the block 47 and consequently the piston rod rearwardly to expel the herbicide from the cylinder 42 through the tube 41 to the spray head 5.

Figure 7:
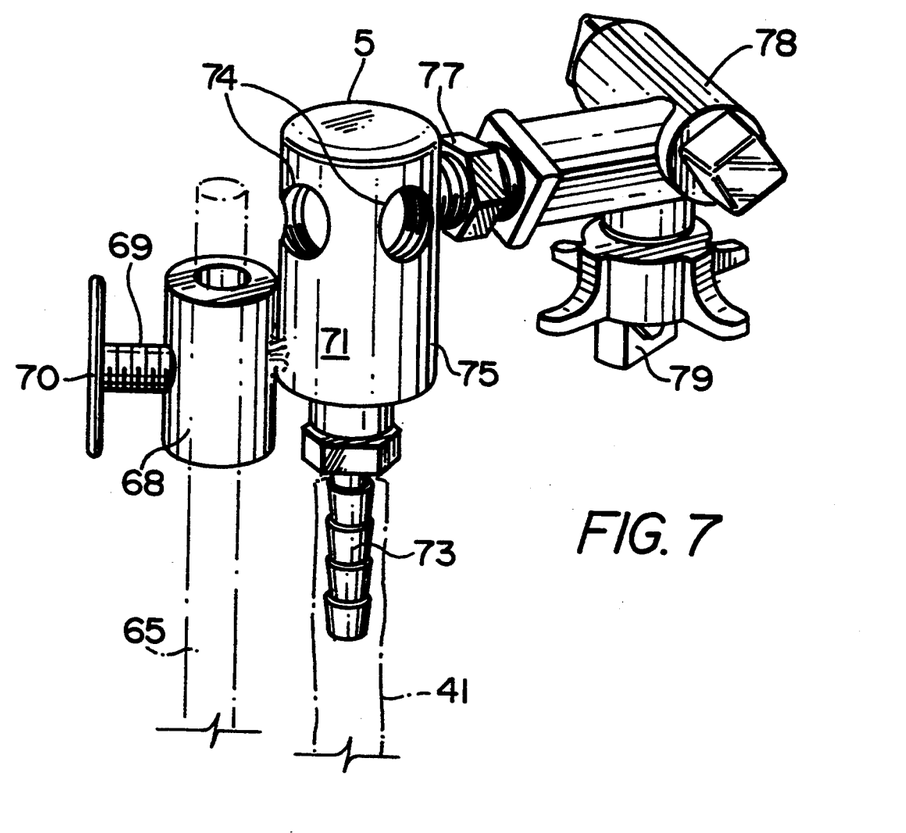
FIG. 7 is a perspective view of a sprayer head used in the apparatus of FIGS. 1 to 4, with parts omitted.

As best shown in FIG. 7, the spray head 5 is adjustably mounted on the top end of a rod 65, which extends upwardly from an annular bracket 66 (FIG. 1) on the top end of the shroud 2. Set screws (not shown) in the side of the bracket 66 releasably retain the rod 65 in the bracket 66. The spray head 5 includes a sleeve 68 for slidably mounting the spray head on the rod 65. The head 5 is fixed in position by a screw 69 with a small rod-shaped handle 70 on the outer end thereof. A central, hollow, cylindrical manifold 71 with closed ends is welded to the sleeve 68. Liquid from the tube 41 enters the bottom end of the manifold 71 via a coupling 73. Four threaded holes 74 are provided in the side wall 75 of the manifold 71. The holes 74 are at right angles to each other for receiving connectors 77 (one shown in FIG. 7). The connectors 77 carry generally T-shaped nozzles 78, which are off the shelf items. The discharge ends 79 of the nozzles 78 are directed downwardly for spraying herbicide around the periphery of the shroud 2. The elements 78 and 79 are available from Spraying Systems Inc., and bear Model Nos. 8600 and TJ60-8006, respectively.

Figure 8:
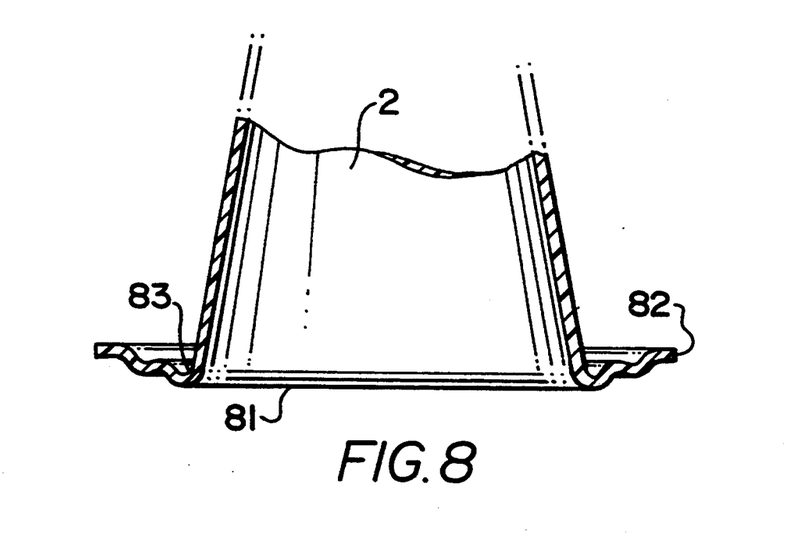
FIG. 8 is a cross-sectional view of the bottom end of a shroud used in the apparatus of FIGS. 1 to 4.

The spray from the nozzles 78 is directed around the periphery of the bottom end 81 of the shroud 2. In order to ensure that herbicide does not accumulate in the area of the bottom of the shroud 2, the latter includes an annular horizontal flange 82. As shown FIG. 8, the flange 82 curves upwardly forming a well 83 for receiving any herbicide flowing down the exterior surface of the shroud 2.

In the following description of a second embodiment of the invention, whenever possible the same reference numerals have been used to designate elements the same or similar to those found in FIGS. 1 to 8.

Referring to FIGS. 9 to 14, in a second embodiment of the invention, the fertilizer flowing through the tube 17 is fed into the tube 1 by a metered dispenser generally indicated at 86. The dispenser 86 is defined by a square cross section, tubular casing 87 with an inlet cowl 89 (FIGS. 10 and 11) on the top thereof for receiving the fertilizer from the tube 17. A small stand 91 is used to mount the casing 87 on the tube 1, the casing sloping downwardly towards the front end of the tube 1. Fertilizer entering the cowl 89 drops through an opening 93 in the top of a tube 94 which is slidably mounted in the casing 87. Forward movement of the tube 94 is limited by a stop 95 welded to the tube 1. The trailing end of the tube 94 is closed by an end wall 97, and a partition 98 is provided at the front of the opening 93 to define a well 100 for receiving the fertilizer entering via the cowl 89. The well 100 also has an open bottom end permitting the escape of fertilizer when the well is aligned with an outlet tube 101 extending between the upper end of the casing 87 and the tube 1. Thus, when the tube 94 is in the forward or lowermost position (FIG. 10), fertilizer can flow through the tube 17 and the cowl 89 into the well 100, and, when the tube 94 is slid rearwardly and upwardly so that the well is aligned with the outlet tube 101, the fertilizer is discharged into the tube 1. The tube 94 is caused to slide in the casing 87 by a rod 103 connected to the end wall 97. The rod 103 extends out of the open rear end 104 of the casing 87, and the outer end of the rod is connected to a lever 106 near the top end thereof. The lever 106 is pivotally connected to the tube 1 for rotation around a horizontal axis.

Figure 9:
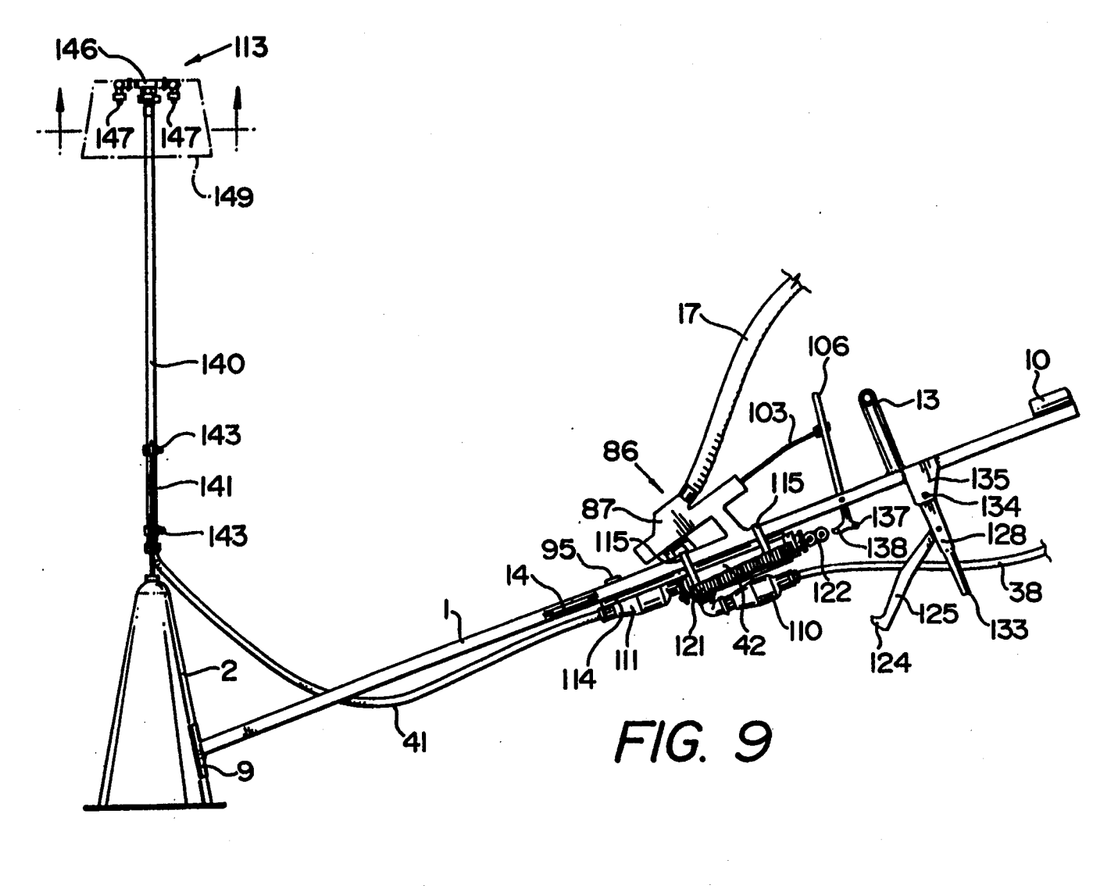
FIG. 9 is a schematic side elevational view of a second embodiment of the apparatus of the present invention.
Figure 10:
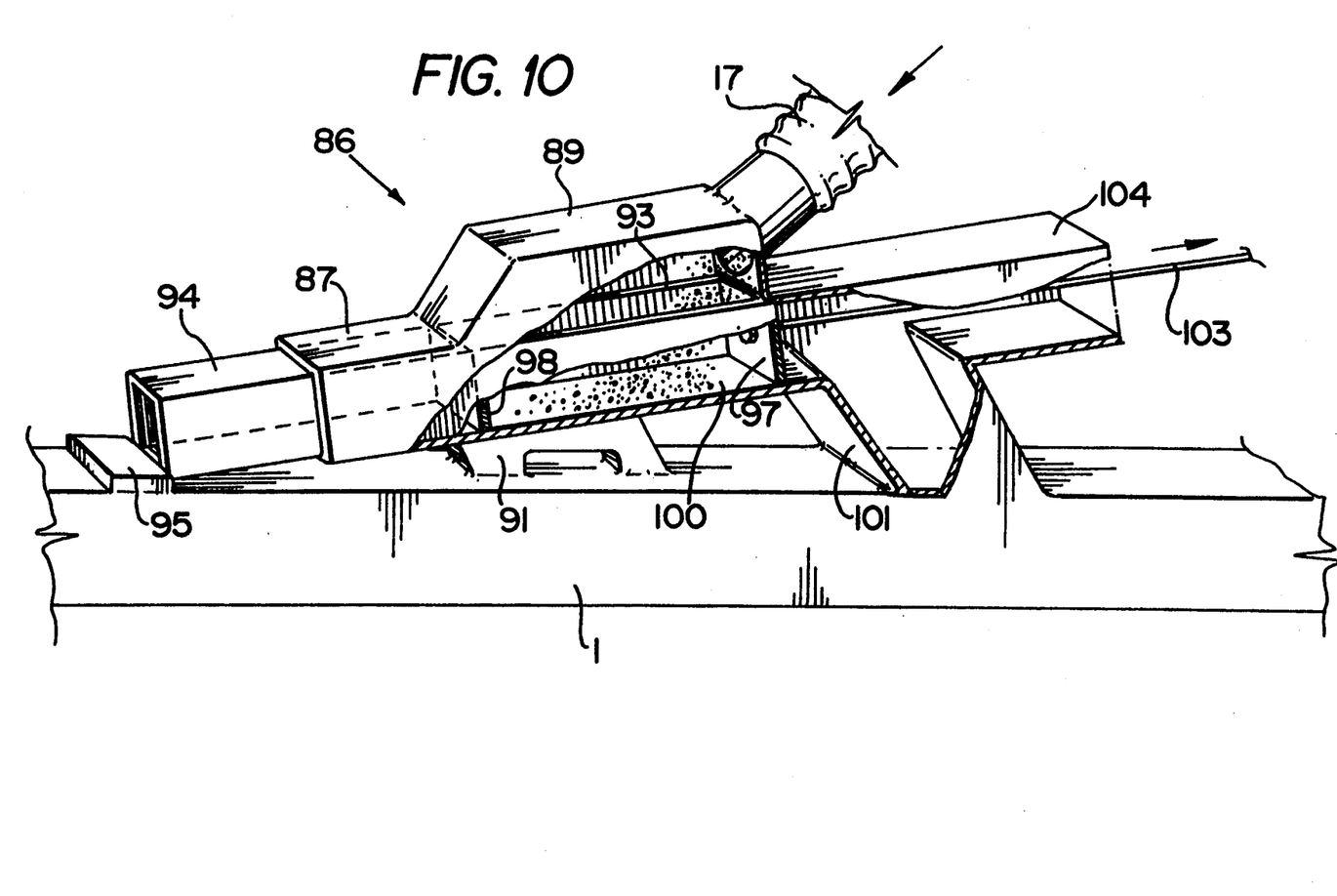
FIG. 10 is a partly sectioned, perspective view of a fertilizer dispenser used in the apparatus of FIG. 9.
Figure 11:
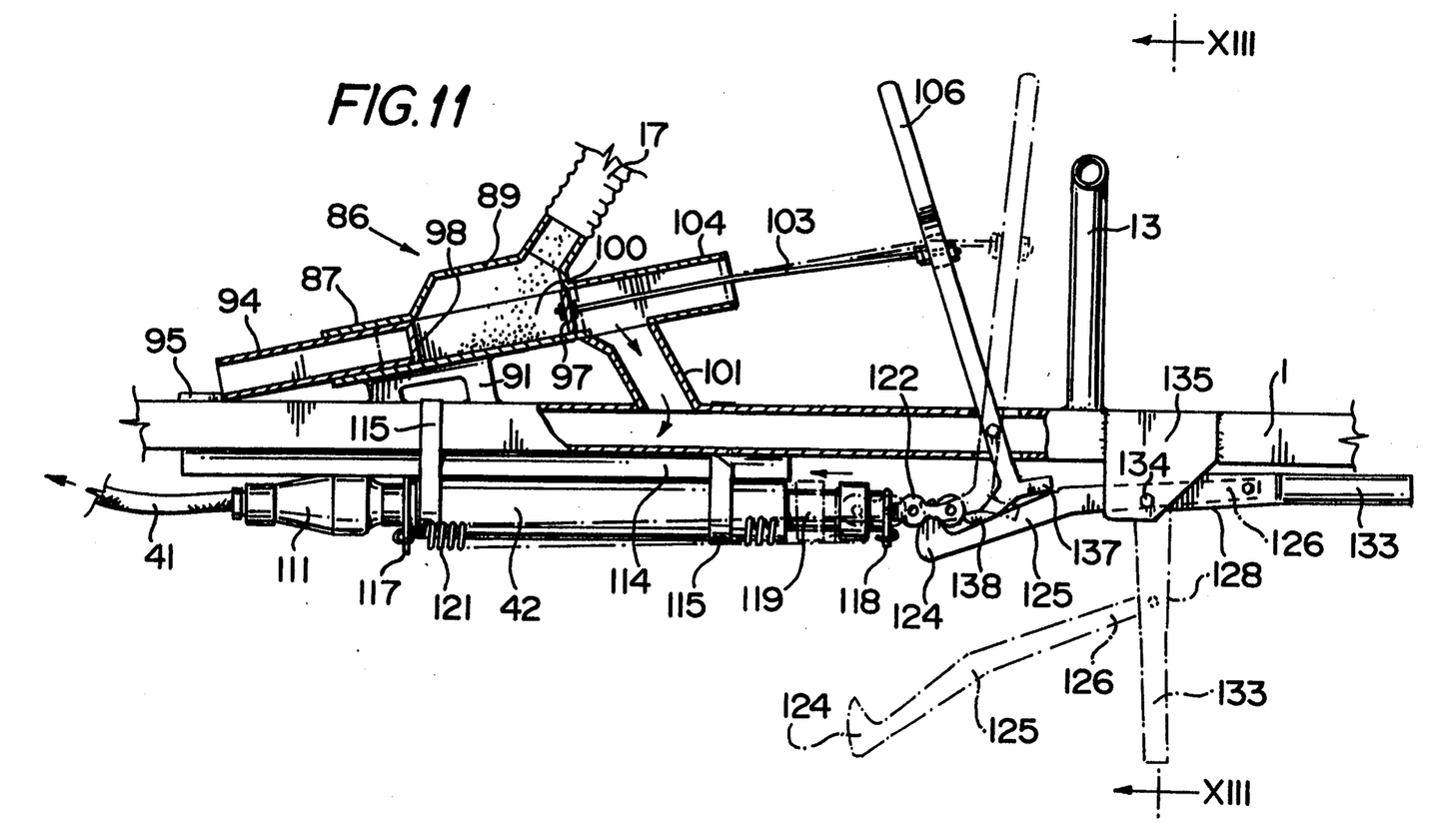
FIG. 11 is a partly sectioned, side elevational view of one end of the apparatus of FIG. 9, with parts omitted.
Figure 12:
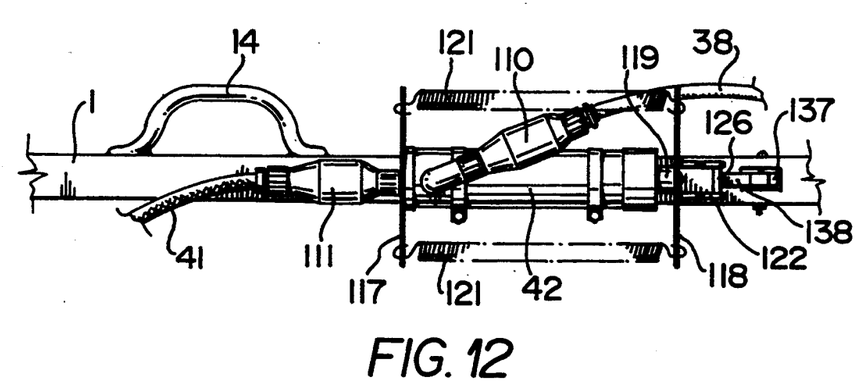
FIG. 12 is a bottom elevational view of a herbicide pump used in the apparatus of FIG. 9.

As best shown in FIGS. 9 and 12, liquid herbicide flows into a cylinder 42 via a tube 38 and a one-way valve 110, and is dispensed through a second one-way valve 111 and a tube 41 to a spray head generally indicated at 113. The cylinder 42, which forms part of a pump, is mounted in a section 114 of angle iron (FIG. 11) on the bottom of the tube 1 beneath the fertilizer dispenser 86 using straps 115. Crossbars 117 and 118 extend outwardly from the closed end of the cylinder 42 and from the free end of a piston rod 119, respectively for supporting the ends of a pair of springs 121.

Figure 13:
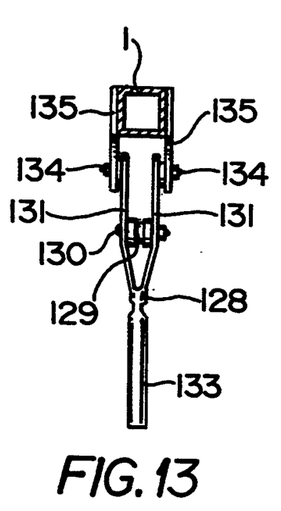
FIG. 13 is a cross section taken generally along line XIII—XIII of FIG. 11.

A portion of a latch defined by a bracket 122 is provided on the crossbar 118 for releasably retaining a hook 124 on one end of an arm 125. The bracket 122 is, in fact, one link of a chain with only a single roller 126 (see FIG. 12) between the sides thereof. The other end 126 of the arm 125 is pivotally connected to an elongated Y-shaped lever 128 by a roller 129 (FIG. 13). The roller 129 is mounted on a bolt 130 extending between the arms 131 of the lever 128. The stem of the lever 128 defines a handle 133 on the outer free end of the lever. The top free ends of the arms 131 are pivotally mounted on bolts 134 in a bracket defined by a pair of plates 135 welded to the tube 1.

When the lever 128 is in the non-use position (shown in phantom outline in FIG. 11), the hook 124 can manually be inserted into the opening in the bottom of the bracket 122 which causes the lever 128 to rotate rearwardly and upwardly. When the lever 128 is pulled rearwardly, the piston rod 119 is caused to move out of the cylinder 42 to draw liquid herbicide into the cylinder. In the cylinder loaded or cocked position, the handle 133 is approximately parallel to the tube 1 (solid lines in FIG. 11). When the lever 106 is pulled rearwardly to cause dispensing of fertilizer from the well 100 into the tube 1, a cam defined by the heel 137, of a foot 138 on the bottom of the lever 106 pushes the hook 124 out of the bracket 122 to release the piston rod 119. Thus, herbicide flows to the spray head 113 and solid fertilizer is dispensed to the shroud 2.

Figure 14:
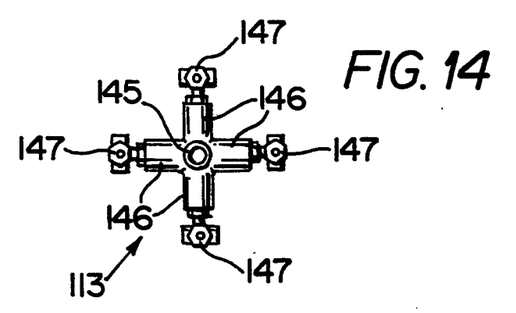
FIG. 14 is a bottom elevation view of a sprayer head used in the apparatus of FIG. 9.

With reference to FIGS. 9 and 14, liquid flowing through the tube 41 enters the bottom end of a solid plastic tube 140, which carries the spray head 113. The tube 140 is mounted on the shroud 2 by means of a pair of threaded rods 141 (one shown) extending through the top of the shroud 2 and retained therein by internal and external nuts. The rods 141 are connected to the tube 140 by conventional hose clamps 143.

The spray head 113 (FIG. 14) includes a central inlet tube 145 and four horizontal outlet tubes 146 with downwardly directed spray nozzles 147 on the outer ends thereof. A frusto-conical shroud 149 (FIG. 9) can be provided on the spray head 113 for protecting the nozzles 147 from the wind, i.e. for limiting deflection of liquid sprayed from the nozzles 147.

Thus, there has been described two embodiments of an apparatus for substantially simultaneously dispensing metered quantities of fertilizer to a seedling or other plan and herbicide to the area surrounding the plant.

I claim:

1. A plant fertilizer and pesticide sprayer apparatus comprising manually manipulable frame means; shroud means on one end of said frame means for covering a plant during pesticide application; pump means carried by said frame means for dispensing pesticide from a source thereof to an area around said shroud means; fertilizer dispensing means carried by said frame means for applying fertilizer from a source thereof to the area inside said shroud means; and trigger means for simultaneously operating said pump means and said fertilizer dispensing means.

2. An apparatus according to claim 1, wherein said frame means is tubular for defining said passage means.

3. An apparatus according to claim 2, including spray head means on said shroud means for spraying pesticide onto an area immediately surrounding said shroud means.

4. An apparatus according to claim 3, wherein said pump means includes cylinder means on said frame means; piston rod means slidable in said cylinder means for drawing pesticide into said cylinder means and for discharging the pesticide to said spray head means, said piston rod means being operated by said trigger means.

5. An apparatus according to claim 4, wherein said trigger means includes lever means for causing movement of said piston rod means out of said cylinder means; release means for causing said lever means to release said piston rod means; and spring means for returning said piston rod means into said cylinder means, whereby pesticide is drawn into and then expelled from said cylinder means.

6. An apparatus according to claim 4, wherein said trigger means includes block means on one end of said cylinder means; said piston rod means extending out of the other end of said cylinder means; lever means pivotable on said frame means for engaging said block means to cause movement of the cylinder means relative to the piston rod means; cam means for causing said lever means to release said block means; and spring means for returning said cylinder means to a rest position, whereby pesticide is drawn into and then expelled from said cylinder means.

7. An apparatus according to claim 4, wherein said dispensing means includes casing means on said frame means; body means adapted for movement by said trigger means in said casing means between fertilizer receiving and dispensing positions; and well means in said body means for receiving a metered quantity of fertilizer from a source thereof, whereby movement of said body means to the dispensing position results in the discharge of a metered quantity of fertilizer from said well means into said frame means and consequently into said shroud means.

8. An apparatus according to claim 7, wherein said casing means is annular, and said body means is disc-shaped, said well means extending radially of one side of said body means.

9. An apparatus according to claim 8, including inlet means in one side of said casing means for admitting fertilizer from a source thereof into said well means; and outlet means in a bottom side of said casing means for discharging fertilizer from the dispensing means when the well means is aligned with the outlet means.

10. An apparatus according to claim 7, wherein said casing means is first tube means; and said body means is second tube means slidable in said first tube means, said well means extending diametrically through said second tube means.

11. An apparatus according to claim 10, including inlet cowl means on a top side of said first tube means for receiving fertilizer; and outlet tube means in a bottom side of said first tube means for discharging fertilizer to said frame means.

12. An apparatus according to claim 1, wherein said shroud means defines an inverted cone.

13. An apparatus according to claim 1, wherein said shroud means defines an inverted cone, and includes an annular upwardly extending peripheral flange on the bottom end thereof for limiting the ingress of liquid pesticide beneath the shroud means.

14. An apparatus according to claim 3, wherein said spray head means includes a tubular inlet manifold; tubular outlet arms extending radially outwardly from said inlet manifold; and downwardly directed spray nozzles on the outer ends of said outlet arm.

15. An apparatus according to claim 14, including four outlet arms at right angles to each other for ensuring the spraying of pesticide around the entire periphery of said shroud means.

* * * * *